(12) United States Patent
Coker et al.

(10) Patent No.: US 8,988,807 B1
(45) Date of Patent: Mar. 24, 2015

(54) DISK DRIVE WITH DIFFERENT DATA SECTOR INTEGRATED PREAMBLES IN ADJACENT DATA TRACKS

(71) Applicant: HGST Netherlands B.V., Amsterdam (NL)

(72) Inventors: Jonathan Darrel Coker, Rochester, MN (US); Richard Leo Galbraith, Rochester, MN (US); Weldon Mark Hanson, Rochester, MN (US); Travis Roger Oenning, Rochester, MN (US); Srinivasan Surendran, Irvine, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/031,989

(22) Filed: Sep. 19, 2013

(51) Int. Cl.
*G11B 5/09* (2006.01)
*G11B 20/12* (2006.01)

(52) U.S. Cl.
CPC .... *G11B 20/1217* (2013.01); *G11B 2020/1232* (2013.01)
USPC ..................... 360/51; 360/25; 360/31; 360/53

(58) Field of Classification Search
None
See application file for complete search history.

(56) References Cited

U.S. PATENT DOCUMENTS

| | | | | |
|---|---|---|---|---|
| 6,967,808 B1* | 11/2005 | Bandic et al. | ............... | 360/77.08 |
| 7,009,805 B2* | 3/2006 | Wong et al. | ................ | 360/77.06 |
| 7,046,694 B2* | 5/2006 | Kumar | ........................... | 370/487 |
| 7,835,094 B2* | 11/2010 | Bedillion | ......................... | 360/29 |
| 7,843,988 B1* | 11/2010 | Snodgrass | ..................... | 375/146 |
| 8,131,920 B2* | 3/2012 | Hattori et al. | .................. | 711/112 |
| 8,379,498 B2* | 2/2013 | Mathew et al. | ............ | 369/47.28 |
| 8,593,750 B2* | 11/2013 | Shibano | ........................ | 360/55 |
| 8,681,444 B2* | 3/2014 | Zhang et al. | .................... | 360/49 |
| 2005/0264907 A1* | 12/2005 | Dati et al. | ........................ | 360/48 |
| 2009/0040651 A1* | 2/2009 | Kudo et al. | ................ | 360/77.01 |
| 2010/0118427 A1* | 5/2010 | Buch et al. | ...................... | 360/51 |
| 2011/0149432 A1* | 6/2011 | Coker et al. | ............... | 360/77.08 |

OTHER PUBLICATIONS

Kasami, "Weight distribution formula for some class of cyclic codes", Technical Report 285, University of Illinois, 1966.
Fan et al., "Class of binary sequences with zero correlation zone", IEEE Electronics Letters, May 1999.

* cited by examiner

*Primary Examiner* — Dismery Mercedes
(74) *Attorney, Agent, or Firm* — Thomas R. Berthold (57) ABSTRACT

A hard disk drive has disks with data sector preambles that allow for inter-track interference. The same data sector preamble is used for all data sectors in a track but the preamble in each track is different from the preamble in radially adjacent tracks. In a first embodiment each preamble includes a synchronization field (SF) and synchronization mark (SM) that are the same in each track but different from the SF and SM in radially adjacent tracks. Only two unique SFs and two unique SMs are required, with the two SFs and two SMs alternating in radially adjacent tracks. In a second embodiment the preambles are "integrated", meaning that the preamble is a sequence of bits that does not include separate dedicated fields, like SF and SM. The preamble bit sequences are decoded using matched filters to provide bit synchronization and start-of-data information.

16 Claims, 13 Drawing Sheets

DISK DRIVE WITH DIFFERENT DATA SECTOR INTEGRATED PREAMBLES IN ADJACENT DATA TRACKS

RELATED APPLICATION

This application is related to application Ser. No. 14/031,970 filed Sep. 19, 2013 titled "DISK DRIVE WITH DIFFERENT SYNCHRONIZATION FIELDS AND SYNCHRONIZATION MARKS IN THE DATA SECTOR PREAMBLES IN ADJACENT DATA TRACKS" and assigned to the same assignee as this application.

BACKGROUND OF THE INVENTION

1. Field of the Invention

This invention relates generally to magnetic recording hard disk drives (HDDs), and more particularly to a HDD with improved reading of data in the presence of inter-track interference (ITI).

2. Description of the Related Art

In HDDs, data is written in angularly spaced data sectors in the concentric data tracks of the recording layers on the disks. A data sector preamble precedes each data sector and is written each time data is written in the data sector. The preamble includes a synchronization field (SF) for achieving bit synchronization and a synchronization mark (SM) for indicating the start of the data sector. The writing of the preamble and the data is initiated by the opening of a write gate in the read/write electronics. However, the write gate signal may exhibit jitter so that the preambles in radially adjacent tracks are not precisely aligned circumferentially (i.e., in the along-the-track direction). The result is that there can be track-to-track phase error, which can prevent the read head from achieving bit synchronization or achieving bit synchronization with the data sectors in the wrong data track. An additional problem in achieving bit synchronization arises because of decreased track spacing and inherent track misregistration (TMR) during reading and writing. To meet the demand for HDDs with high data density, the data track spacing or "pitch" has decreased, which means that the concentric tracks are packed closer together. Also, because the heads cannot be precisely positioned radially, there is always some TMR during reading and writing. The result can be track "squeeze", which means that the preambles for data sectors in one track can be partially written over the preambles in radially adjacent tracks. Thus when the read head attempts to read the preamble from one track it will pick up some signal from the preambles in a radially adjacent track due to track squeeze.

The problems caused by write gate jitter, TMR and track squeeze can result in significant inter-track interference (ITI). If ITI is too great, reliable acquisition of synchronization is not possible or the read head may incorrectly synchronize with data sectors in an adjacent data track.

What is needed is a disk drive with the ability to reliably achieve bit synchronization and thus reliably read data even in the presence of significant ITI.

SUMMARY OF THE INVENTION

The invention relates to HDDs with data sector preambles that allow for ITI. In embodiments of this invention the same data sector preamble is used for all data sectors in a track but the preamble in each track is different from the preamble in radially adjacent tracks. In a first embodiment each synchronization field (SF) in each track is different from the SF in radially adjacent tracks, and each synchronization mark (SM) in each track is different from the SM in radially adjacent tracks. Thus only two unique SFs and two unique SMs are required, with the two SFs and two SMs alternating in radially adjacent tracks.

In a second embodiment the preambles are "integrated", meaning that the preamble is a sequence of bits that does not include separate dedicated fields, like SF and SM. The preamble bit sequences are decoded to provide bit synchronization and start-of-data information. Like the first embodiment, the same preamble is used for all data sectors in a track but the preamble in each track is different from the preamble in radially adjacent tracks. The HDD's read/write channel includes a matched filter for each unique preamble sequence and logic that uses the filter outputs to calculate bit synchronization and start-of-data information. Each preamble sequence is selected such that when input to its matched filter, the filter output has a readily detectable single large peak. Sequences that provide the desirable properties of small autocorrelation and low cross-correlation to ensure the ability to handle ITI include Kasami sequences, Gold sequences and zero-correlation zone (ZCZ) sequences.

For a fuller understanding of the nature and advantages of the present invention, reference should be made to the following detailed description taken together with the accompanying figures.

DETAILED DESCRIPTION OF THE INVENTION

Figure 1:
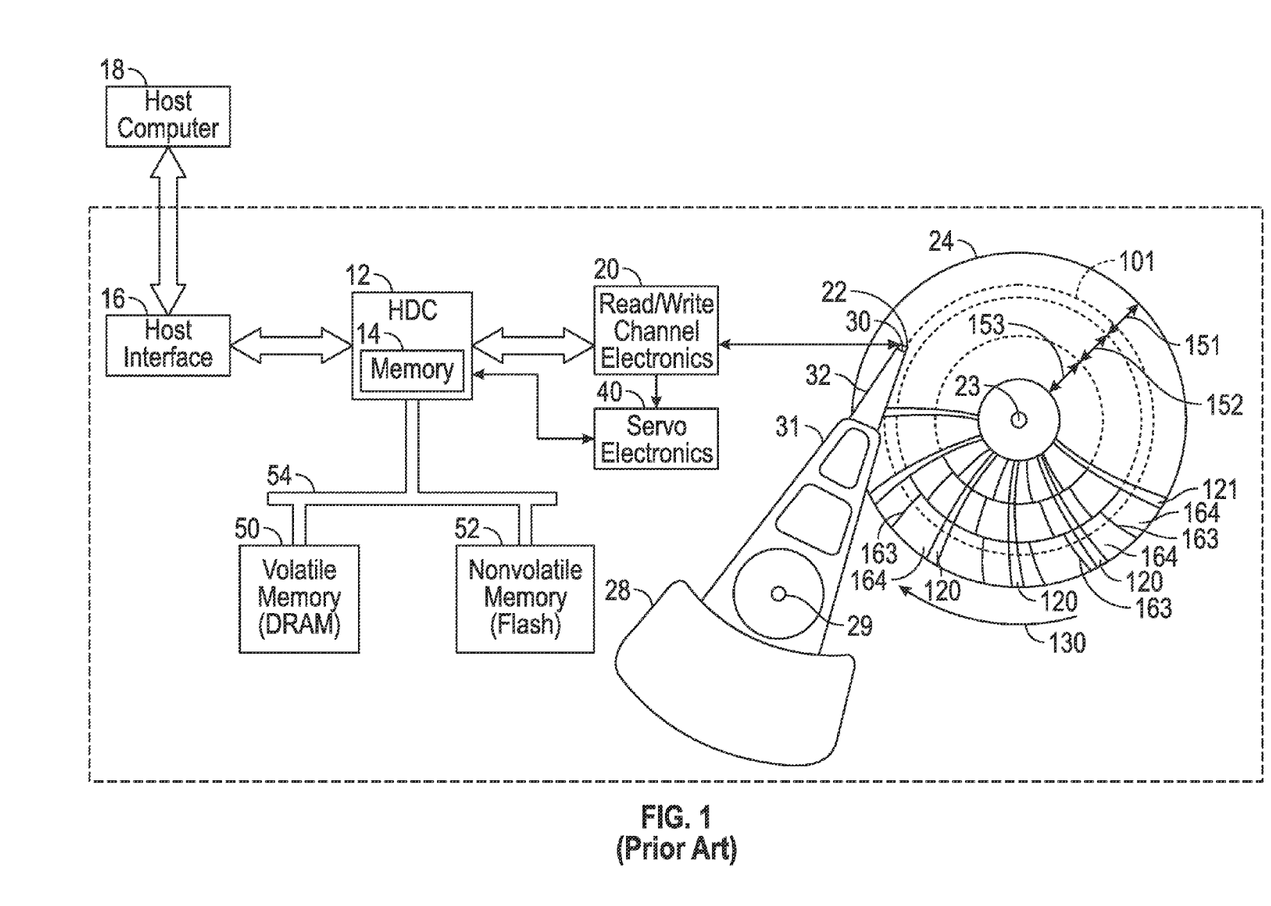
FIG. 1 is a block diagram of a magnetic recording hard disk drive (HDD) according to the prior art.

FIG. 1 is a block diagram of a conventional magnetic recording disk drive (HDD) 10. The HDD 10 includes a hard disk controller (HDC) 12 that can include and/or be implemented by a microcontroller or microprocessor. The controller 12 runs a computer program that is stored in memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host interface 16 may be any conventional computer-HDD interface, such as Serial ATA (Advanced Technology Attachment) or SCSI (Small Computer System Interface).

While the top view of FIG. 1 shows only a single disk 24 and associated read/write head 22, the HDD 10 typically includes a stack of disks 24 that are mounted on a spindle 23 and rotated by a spindle motor (not shown), with each disk surface supporting a magnetic recording layer and being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130. The actuator arm 31 is attached to a rotary actuator 28 that rotates about pivot 29. Thus as the actuator 28 pivots, the path of slider 30 with attached read/write head 22 is not aligned with a disk radius, but is an arcuate path (like that shown by servo sectors 120 described below).

The disk 24 has radially-spaced data tracks, typically circular concentric data tracks, one of which is shown as track 101. Each data track has a reference index 121 indicating the start-of-track. The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone. Each data sector 164 in each track is preceded by a data sector preamble 163 that includes a synchronization (sync) field (SF) and a sync mark (SM). The preambles 163 are detectable by the read head for enabling synchronization of reading and writing the data bits in the data sectors 164. The data sector preamble 163 is a nondata region on the disk that is magnetized each time data is written in its associated data sector 164.

Each data track also includes a plurality of circumferentially or angularly-spaced servo sectors 120 that contain positioning information detectable by the read head for moving the head 22 to desired data tracks and maintaining the head 22 on the data tracks. The servo sectors in each track are aligned circumferentially with the servo sectors in the other tracks so that they extend across the tracks in a generally radial direction, as represented by radially-directed servo sectors 120.

The servo sectors 120 are nondata regions on the disk that are magnetized once, typically during manufacturing or formatting of the disk, and are not intended to be erased during normal operation of the HDD. Typically there are multiple data sectors 164 located between the servo sectors.

The electronics associated with HDD 10 also include servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the servo information from the servo sectors 120 to run a control algorithm that produces a control signal. The control signal is converted to a current that drives actuator 28 to position the head 22. In the operation of HDD 10, interface 16 receives a request from the host computer 18 for reading from or writing to the data sectors 164. Controller 12 receives a list of requested data blocks, called logical block addresses (LBAs), from interface 16 and converts them into physical block addresses (PBAs). The PBAs uniquely identify the physical location on the disk by cylinder (i.e., track), head (i.e., disk surface), and sector, sometimes referred to as the CHS, where the data blocks are to be read or written. The PBAs are passed to servo electronics 40 to enable positioning of the selected head 22 to the selected data sectors 164.

The controller 12 acts as a data controller to transfer blocks of write data from the host computer 18 through the read/write electronics 20 for writing to the disks 24 by the write head, and to transfer blocks of read data read from the disks 24 by the read head back to the host computer 18. HDDs typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

Figure 2:
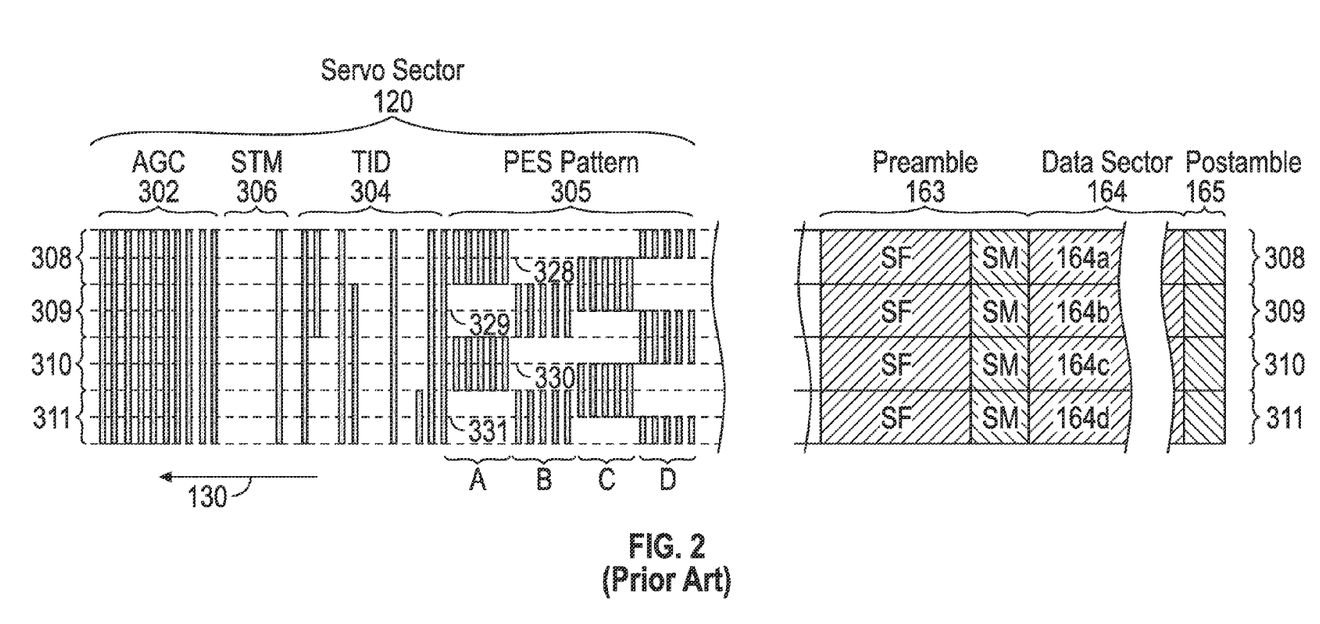
FIG. 2 is a schematic of a portion of the disk recording layer according to the prior art and showing typical servo sector and data sectors spanning several data tracks.

FIG. 2 is a schematic of a portion of the disk recording layer according to the prior art and showing typical servo sector 120 and data sectors 164 spanning several data tracks 308-311, each data track having a respective track centerline 328-331. The servo sector 120 and data sectors 164 move relative to read/write head 22 in the direction shown by arrow 130.

The two possible magnetic states in the servo sector 120 (e.g., perpendicular positive and negative magnetizations) are indicated as black and white regions. The servo sector is comprised of four distinct fields: automatic gain control (AGC) field 302, servo-timing-mark (STM) field 306 (also called servo identification or SID), track ID (TID) field 304 and position-error-signal (PES) field 305. The AGC field 302 is a regular series of transitions and is nominally the same at all radial positions. The AGC field 302 allows the servo processor on the servo electronics 40 to calibrate timing and gain parameters for later fields. The servo timing mark (STM) field 306 serves as a timing reference for reading the subsequent servo information in track identification (TID) field 304 and position error signal (PES) field 305. The TID field 304 contains the track number, usually Gray-coded and written as the presence or absence of recorded dibits. The TID field 304 determines the integer part of the radial position of head 22.

The position error signal (PES) field 305 contains PES bursts A-D that form the well-known quad-burst or quadrature pattern and are used to determine the fractional part of the radial position of the head. Each PES burst comprises a series of regularly spaced magnetic transitions.

The data sectors 164 are shown for the four tracks and include encoded data written in the data sectors in each track, 164a-164d in tracks 308-311, respectively. The data sectors are preceded by a data sector preamble 163 and followed by a data sector postamble 165. The preambles 163 are the same for each track and include a sync field (SF) and a sync mark (SM). The SF is used to calibrate gain and achieve bit synchronization. The SM indicates the start of encoded data in the immediately following data sector. The postamble has a variety of uses, most common of which is to properly flush the detector path memory, but also sometimes used to degauss the read head.

Figure 3A:
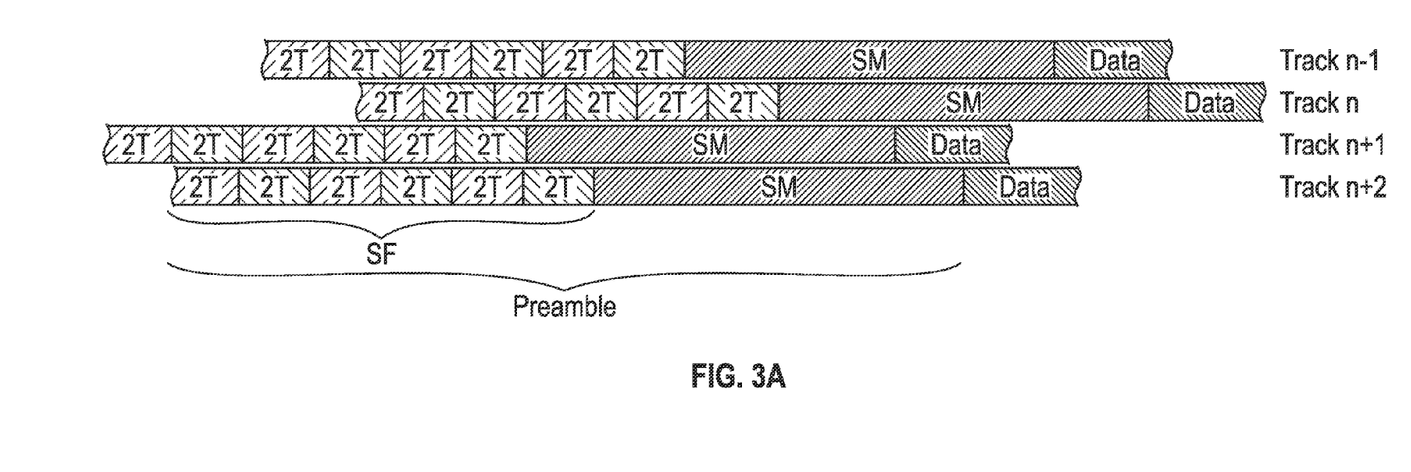
FIG. 3A is a schematic of four data tracks showing the circumferential misalignment (track-to-track phase error) as a result of write gate jitter.

The writing of the preamble and encoded data in the associated data sector is written in each track by the opening of a write gate in the read/write electronics. This initiates the generation of positive and negative write pulses to the write head by write driver circuitry. However, the write gate signal may exhibit jitter so that the preambles in radially adjacent tracks are not precisely aligned circumferentially (the along-the-track direction). This problem is shown in FIG. 3A, which shows four tracks (n-1 to n+2), wherein the SF is depicted as a typical 2T frequency (a pattern of positive magnetization for 2T followed by a negative magnetization for 2T, where T is the duration of a bit). The result is that there can be track-to-track phase error, which can prevent the read head from achieving bit synchronization or achieving bit synchronization with the wrong data track.

Figure 3B:
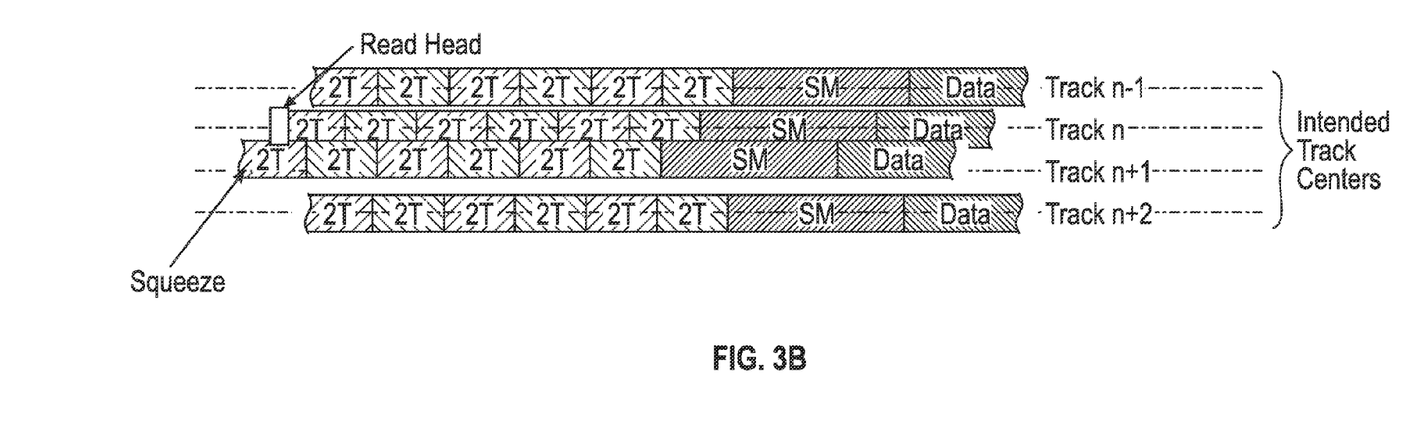
FIG. 3B is a schematic of four data tracks showing track squeeze as a result of track misregistration (TMR) during writing.

An additional problem in achieving bit synchronization arises because of decreased track spacing and inherent track misregistration (TMR) during reading and writing. To meet the demand for HDDs with high data density, the data track spacing or "pitch" has decreased, which means that the concentric tracks are packed closer together. Also, because the heads cannot be precisely positioned radially, there is always some TMR during reading and writing. The result can be track "squeeze", as depicted in FIG. 3B, wherein track n+1 was written partially over track n due to TMR during writing. Thus when the read head attempts to read back track n it will pick up some track n+1 signal due to track squeeze. The read head may also pick up adjacent track signals due to TMR during reading.

The issues of write gate jitter, track squeeze and TMR can result in significant inter-track interference (ITI). If ITI is too great, reliable acquisition of synchronization is not possible or the read head may incorrectly synchronize with an adjacent data track.

Figure 4:
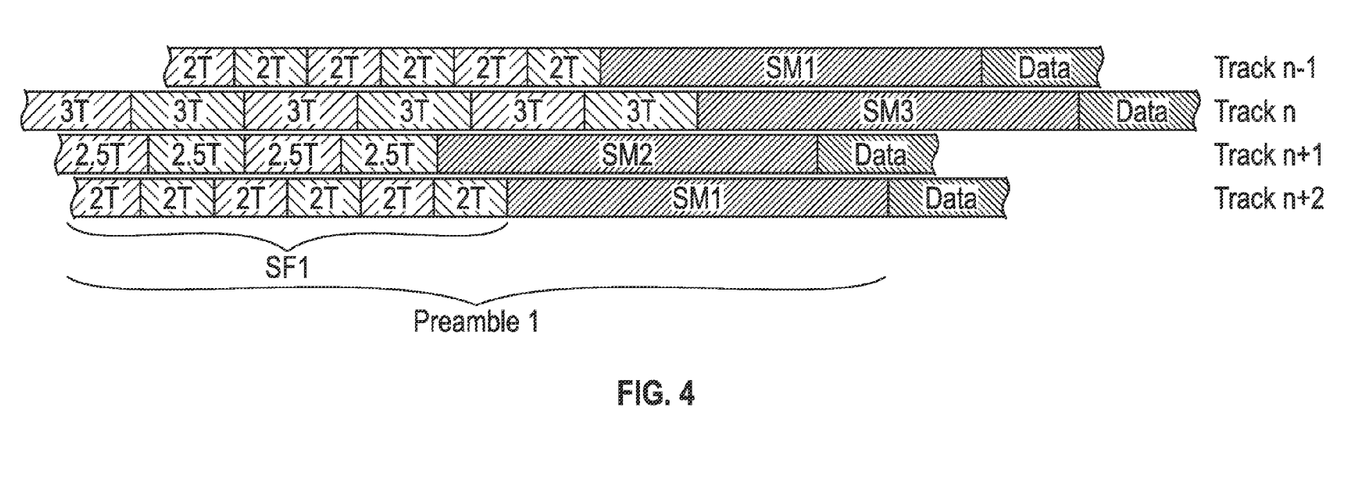
FIG. 4 is a schematic of four data tracks according to embodiments of the invention showing three unique data sector preambles that periodically repeat in the radial direction.

In embodiments of this invention the same data sector preamble is used for all data sectors in a track but the preamble in each track is different from the preamble in radially adjacent tracks. In a first embodiment each SF in each track is different from the SF in radially adjacent tracks, and each SM in each track is different from the SM in radially adjacent tracks. Thus only two unique SFs and two unique SMs are required, with the two SFs and two SMs alternating in radially adjacent tracks. If there are only two SFs, then for example one SF can be a 2T frequency and the other SF can be either a periodic 2.5T frequency (a pattern of positive magnetization for 2.5T followed by a negative magnetization for 2.5T) or a periodic 3T frequency (a pattern of positive magnetization for 3T followed by a negative magnetization for 3T). While at least two unique SFs and two unique SMs are required, preferably there are at least three unique SFs and three unique SMs that periodically repeat in radially adjacent tracks. FIG. 4 is a section of a magnetic recording layer showing four tracks from track n-1 to track n+2 with three unique SFs and three unique SMs according to an embodiment of the invention. In the radial direction, the preambles are SF1=2T and SM1 in track n+2, SF2=2.5T and SM2 in track n+1, and SF3=3T and SM3 in track n. This sequence then repeats with SF1=2T and SM1 in track n-1. The use of three or more unique preambles in any three radially adjacent tracks assures that the preamble of a selected track will be uniquely identified even in the presence of ITI.

Figure 5:
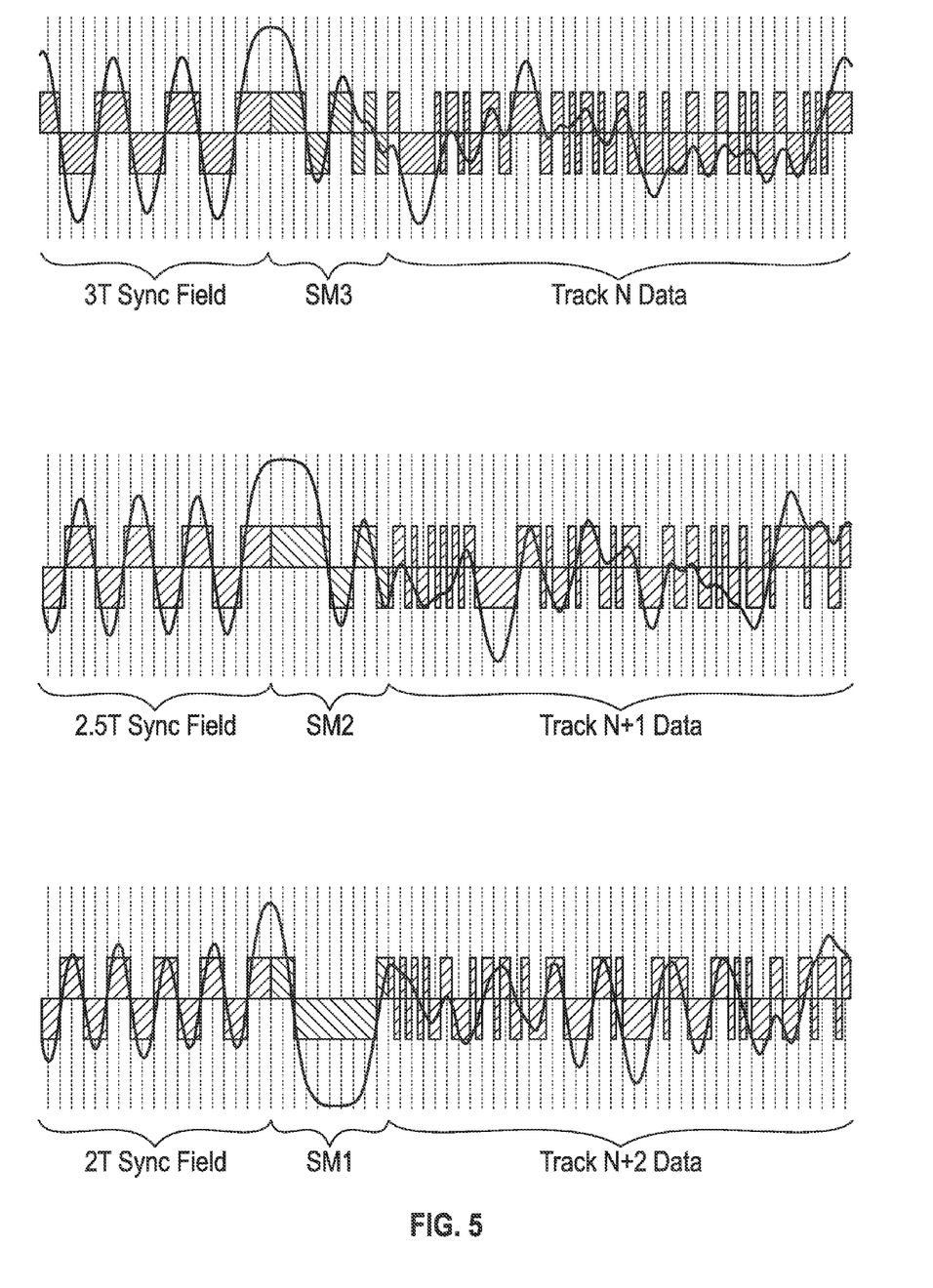
FIG. 5 shows specific bit patterns for three unique sync fields (SFs) and sync marks (SMs) in three radially adjacent data tracks according to embodiments of the invention, along with portions of the encoded data in the data sectors.

FIG. 5 shows the specific bit patterns for the three unique SFs and SMs of FIG. 4 in three radially adjacent data tracks, along with portions of the encoded data in the data sectors. The wavy lines represent the analog readback signal that would be detected by the read head centered at each of the three data tracks.

Because the readback signal is not a perfect sine wave there will be higher frequency harmonics for each SF frequency. It is therefore preferable to choose the different SF patterns such that no SF pattern has a first harmonic frequency that is the same as the frequency of any other SF pattern. For example, if a low frequency (e.g., 4T pattern) were to be used in track n+1 in place of the 2.5T pattern, when it is read back it will contain a higher frequency 2T component. The random phase offset (from write gate jitter) in this 2T harmonic component may cause an acquisition error if picked up by the read head when attempting to acquire synchronization with the 2T pattern on track n+2.

For the three unique SMs, they should be chosen such that each SM in a preamble does not appear at any phase shift in the other two preambles. For example, assume a 2T+SM1 preamble is being read, but as a result of TMR an adjacent preamble consisting of 3T+SM3 is picked up. The sync mark detector is for SM1, so it is desirable that the bit sequence for SM1 does not appear anywhere in the bit sequence for the 3T+SM2 preamble. Otherwise, because of track-to-track phase error due to write gate jitter, the incorrect SM could be found.

Figure 6:
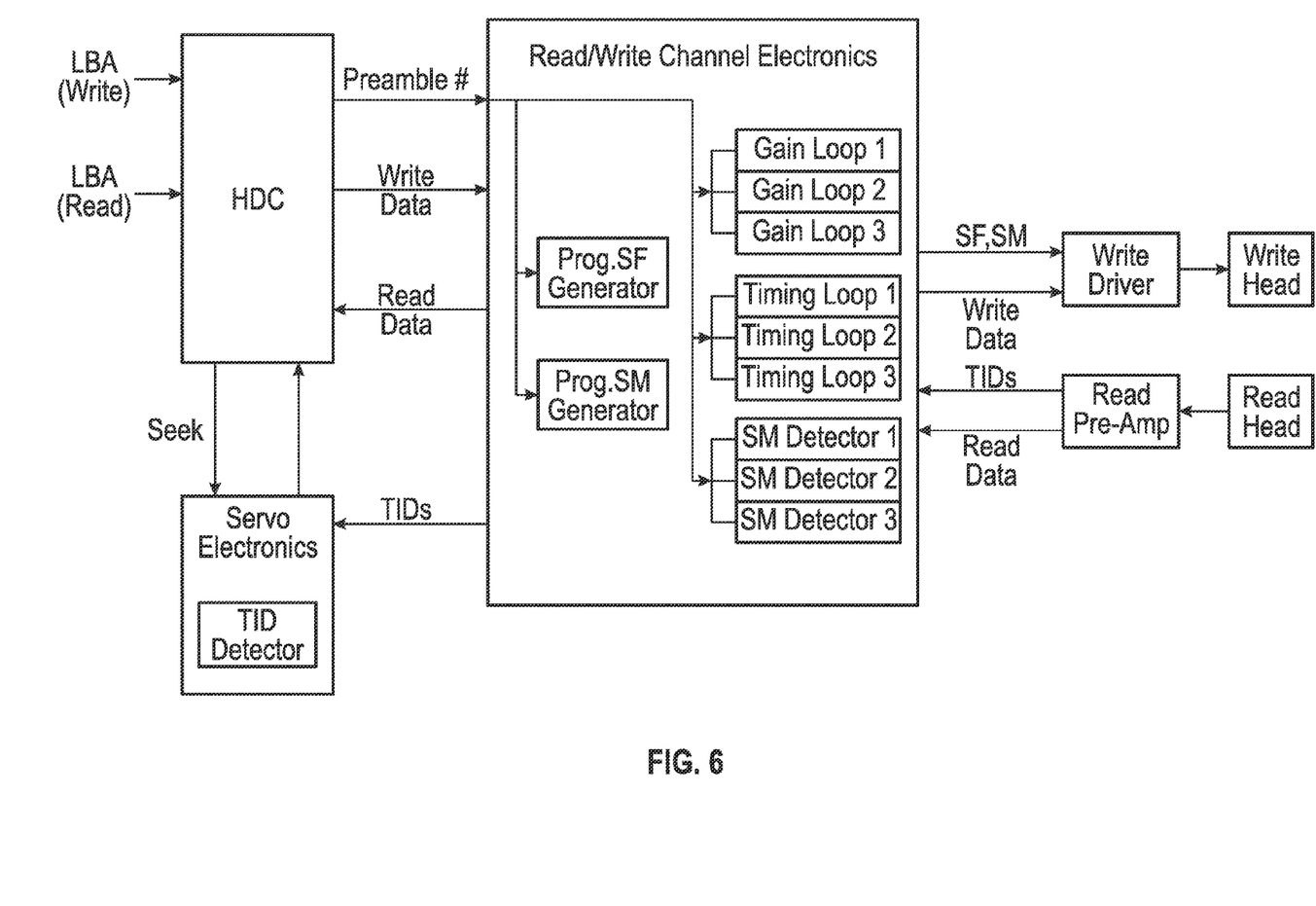
FIG. 6 is a greatly simplified block diagram of the disk drive hardware/software components that perform the functions of writing and reading the unique preambles according to embodiments of the invention.

FIG. 6 is a greatly simplified block diagram of the disk drive hardware/software components that perform the functions of writing and reading the unique preambles. The method of writing the different preambles will be explained with reference to FIG. 6 and the flow chart of FIG. 7. The method of reading the different preambles will be explained with reference to FIG. 6 and the flow chart of FIG. 8.

Figure 7:
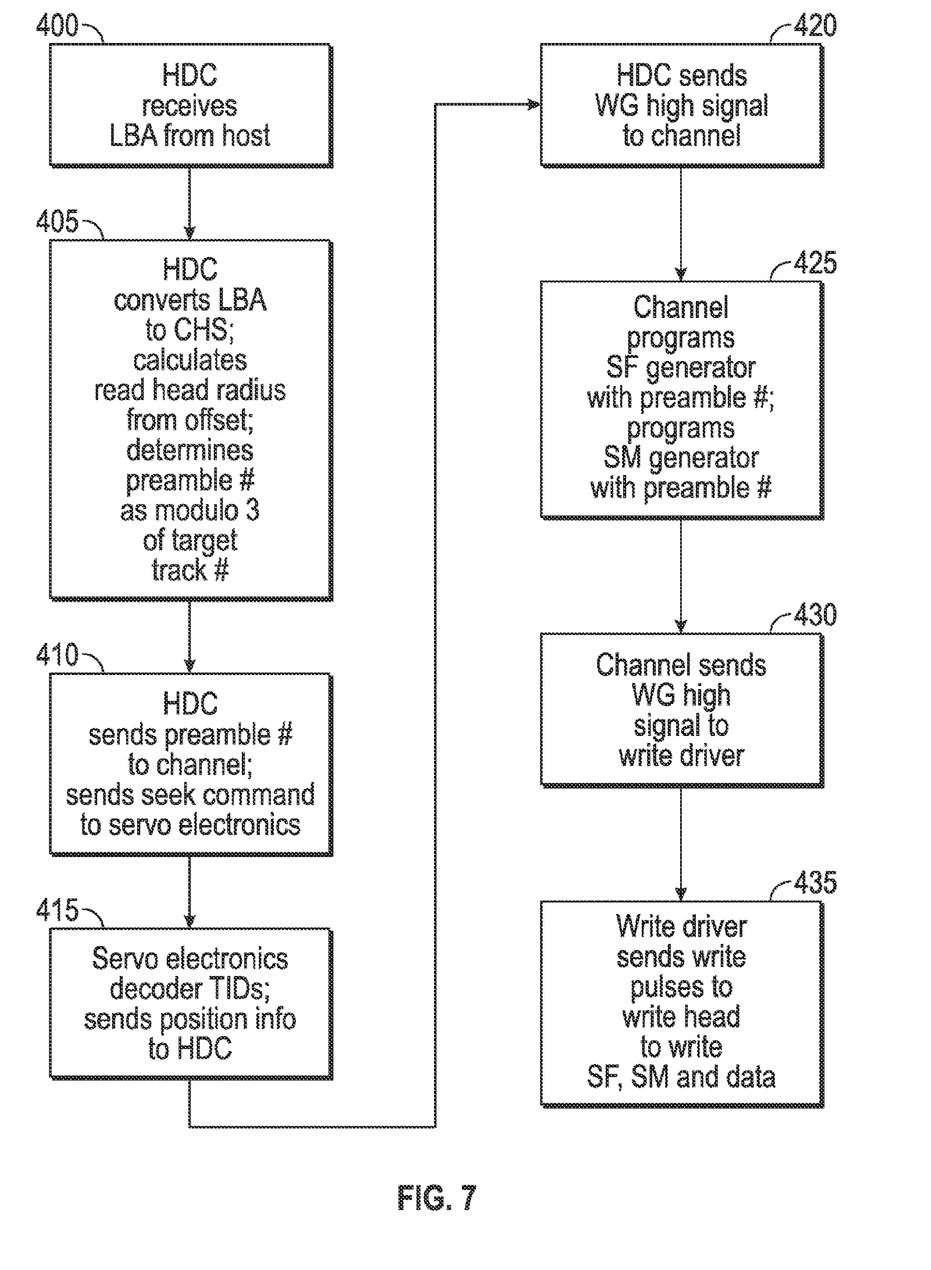
FIG. 7 is a flow chart of the method of writing the different preambles according to embodiments of the invention.

Referring to FIG. 7, at block 400 the HDC receives the LBAs for data blocks to be written from the host. At block 405, the HDC calculates the CHS for the PBAs corresponding to the LBAs. Also, because there is a known offset of the write head from the read head as a function of radius, the HDC uses a lookup table to calculate the read head radial location (track number plus fractional part of a track) that will result in the write head being at the target track. The HDC also computes, from the cylinder number of the CHS (i.e., the physical target track where the data blocks are to be written) the preamble number, i.e., whether preamble 1, 2, or 3 is to be written before the data blocks are written, and at block 410 sends this preamble number to the channel electronics. This computation is a straightforward modulo 3 of the target track number because the three unique preambles periodically repeat radially in the tracks. Alternatively, the channel electronics can compute the preamble number from the cylinder number. In either case the channel electronics identifies which unique SF and SM are to be written prior to writing data in the selected data sector. At block 410 the HDC also issues a seek command to the servo electronics to cause the read head to seek to the desired radial location. At block 415 the servo electronics decodes the TIDs read by the read head and sends position information to the HDC. At block 420, when the read head is at the precise radial location corresponding to the write head being at the target track, the HDC sends a write gate (WG) high signal to the read/write channel. At block 425 the channel programs the programmable SF generator and programmable SM generator with the identified preamble number so the proper SF and SM will be written. At block 430 the channel sets the WG high signal to the write driver, and at 435 the write drivers sends the positive/negative write pulses to the write head to write the SF, SM and data.

Figure 8:
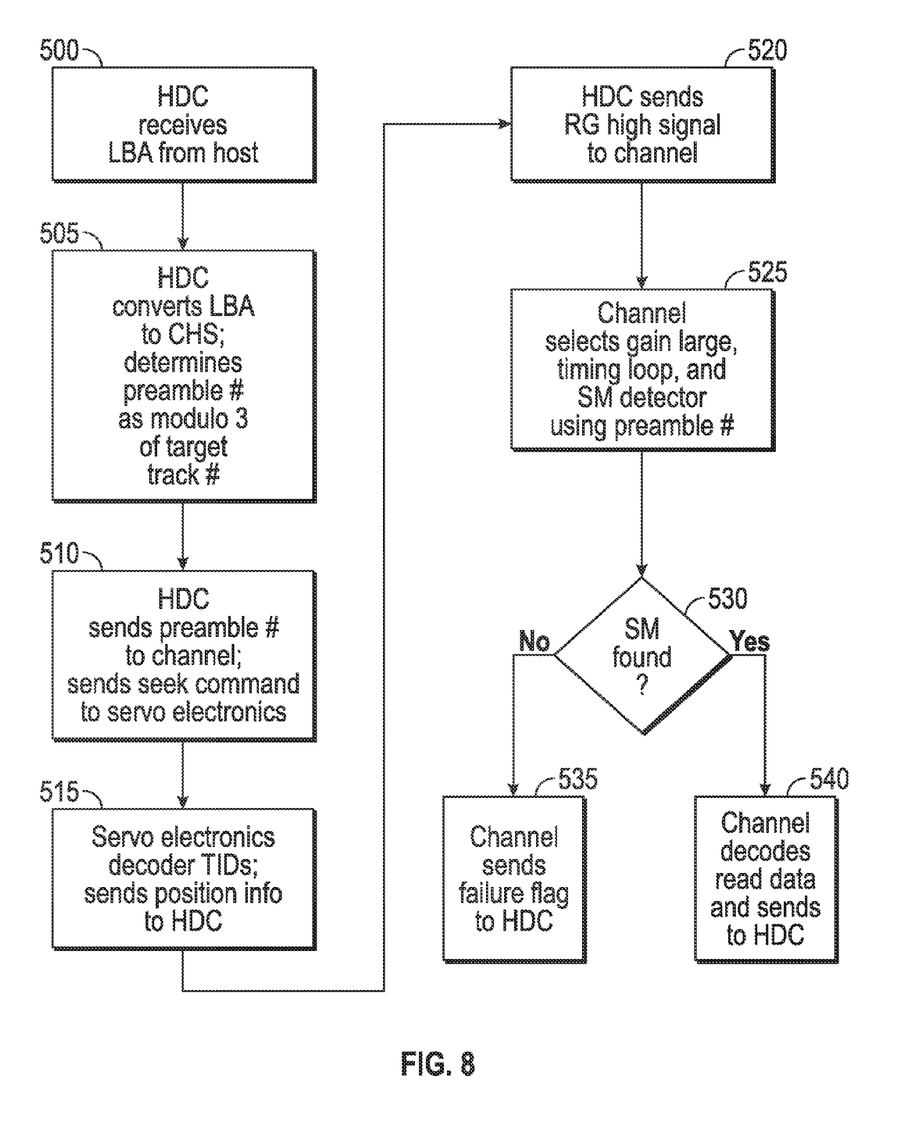
FIG. 8 is a flow chart of the method of reading the different preambles according to embodiments of the invention.

Referring to FIG. 8, at block 500 the HDC receives the LBAs for data blocks to be read and transferred back to the host. At block 505, the HDC calculates the CHS for the PBAs corresponding to the LBAs. The HDC also determines, from the cylinder portion of the CHS (i.e., the physical target track where the data blocks are to be read) the preamble number, i.e., whether preamble 1, 2, or 3 is to be read before the data blocks are read. This is a straightforward modulo 3 of the target track number. At block 510 the HDC sends this preamble number to the read/write channel and issues a seek command to the servo electronics to cause the read head to seek to the target track. At block 515 the servo electronics decodes the TIDs read by the read head and sends position information to the HDC. At block 520, when the read head is at the target track, the HDC sends a read gate (RG) high signal to the read/write channel. At block 525 the channel selects the correct one of the three gain loops, timing loops and SM detectors, using the preamble number. Each of the three unique preambles has an associated gain loop, timing loop and SM detector. At decision block 530, the channel then attempts to detect the selected SF and SM and find the SM. If the SM is not found a failure flag is returned to the HDC at block 535. If the SM is found the channel decodes the data read by the read head and sends it to the HDC.

Figure 9:
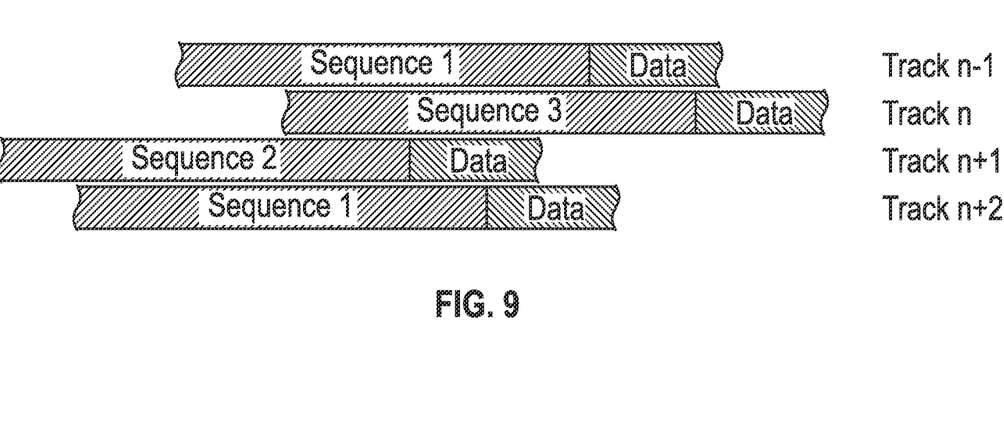
FIG. 9 is a schematic of four data tracks according to a second embodiment of the invention showing three unique integrated preamble sequences that periodically repeat in the radial direction.

In a second embodiment the preambles are "integrated", meaning that the preamble is a sequence of bits that does not include separate dedicated fields, like SF and SM. The preamble bit sequences are decoded to provide bit synchronization and start-of-data information. Like the first embodiment, the same preamble is used for all data sectors in a track but the preamble in each track is different from the preamble in radially adjacent tracks. The read/write channel includes a matched filter for each unique preamble sequence and logic that uses the filter outputs to calculate the gain, bit synchronization and start-of-data information. Each preamble sequence is selected such that when input to its matched filter, the filter output has a readily detectable single large peak. FIG. 9 is a schematic of a section of a magnetic recording layer showing four tracks from track n−1 to track n+2 with three unique integrated preambles as sequences 1, 2 and 3. The three sequences then repeat in the radial direction. While three unique preamble sequences are illustrated, as in the first embodiment only two unique preamble sequences that alternate in radially adjacent tracks are required in the second embodiment.

Figure 10:
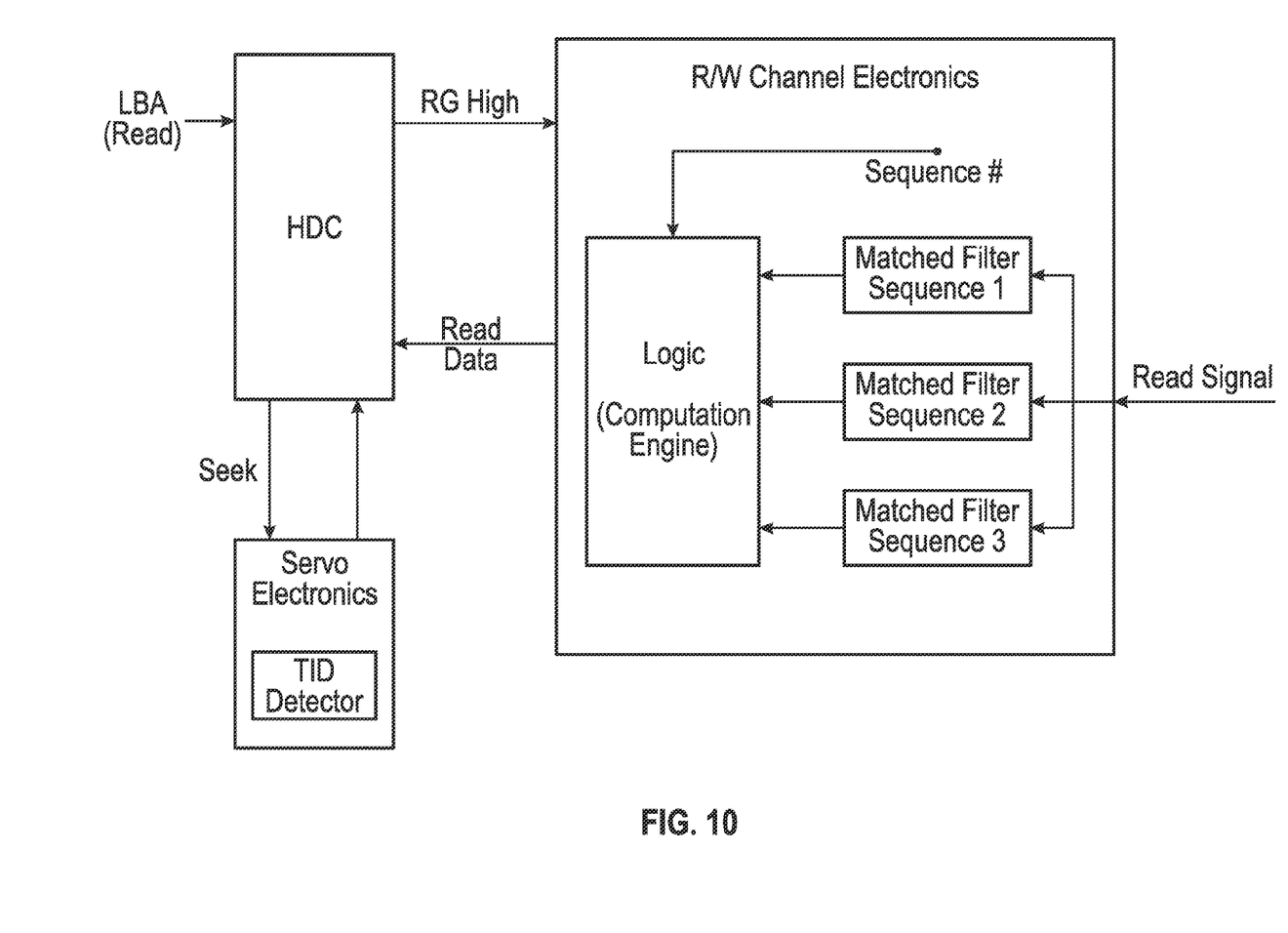
FIG. 10 is a high-level block diagram of the read/write channel electronics for explaining the read process with the second embodiment of the invention.

FIG. 10 is a high-level block diagram of the read/write channel electronics for explaining the read process with the second embodiment. The HDC receives the LBAs to be read from the host and calculates the CHS for the PBAs corresponding to the LBAs. The HDC can also determine, from the cylinder portion of the CHS (i.e., the physical target track where the data blocks are to be read) the sequence number, i.e., whether sequence 1, 2, or 3 is to be read before the data blocks are read. This is a straightforward modulo 3 of the target track number. Alternatively, the channel can determine the sequence number from the cylinder number. In either case the channel identifies the unique sequence to be read. The HDC issues a seek command to the servo electronics to cause the read head to seek to the target track. When the read head is at the target track, the HDC sends a read gate (RG) high signal to the read/write channel. The sequence preceding the target data sector in the target track is then read and input into the set of three matched filters. Each matched filter is for one of the three unique sequences. The output from the set of all three filters is input to logic in the channel, which is the computation engine that computes the gain, bit synchronization and start-of-data as described below.

Each sequence is selected to have small autocorrelation for non-zero lags. This assures that the output of its matched correlator is a single peak. The sequences used in adjacent tracks can be made different by selecting the sequences so that there is low correlation between them, also referred to herein as cross-correlation. Cross-correlation is the complex inner product of a first sequence with a shifted version of a second sequence. Sequences are considered to have good, i.e., "low", cross-correlation properties when there is very little correlation between the sequences as they are shifted against each other. The correlation of two sequences $x_k$ and $y_k$ is defined as the following:

$$R_{x,y}(\tau) = \sum_k x_k y_{k-\tau} \qquad \text{Equation (1)}$$

where $\tau$ is an integer known as the "lag" between the two sequences. This definition of correlation is well-known in the field of signal processing. If a sequence $x_k$ is correlated with itself the result is the following:

$$R_{x,x}(\tau) = \sum_k x_k x_{k-\tau} \qquad \text{Equation (2)}$$

which is referred to as the autocorrelation of the sequence. A property of the autocorrelation is that is has its maximum value at lag 0:

$$R_{x,x}(0) = \sum_k x_k^2 \qquad \text{Equation (3)}$$

To allow for ITI, radially adjacent sequences should have good, i.e., "low" cross-correlation. Two sequences are said to have low cross-correlation if all values of cross-correlation at non-zero lag $R_{x,y}(\tau)$ are small with respect to the autocorrelation at zero lag for either of the sequences $R_{x,x}(0)$ or $R_{y,y}(0)$.

The term "small" is of course relative and depends on the preamble sequence length. Performance will be determined by the distance from the maximum value (at zero lag) to the highest non-zero lag, and whether this distance is sufficient depends on the signal-to-noise ratio (SNR). Thus one measure of small autocorrelation values and small cross-correlation values would be if these values are less than or equal to about one-half the autocorrelation at zero lag. For example, for a 63-bit Kasami sequence described below, the maximum autocorrelation is at zero lag and is 63, so "small" values would be 32 or less.

There are well-known techniques for constructing sequences with the requirements of small autocorrelation and low cross-correlation. Such techniques include, but are not limited to, Kasami sequences, Gold sequences and zero-correlation zone (ZCZ) sequences.

Kasami sequences, as described by Kasami, T. (1966) *Weight Distribution Formula for Some Class of Cyclic Codes* (Technical report R285), University of Illinois, can be generated as follows:
1) Generate a maximum length sequence $x_k$, k=1, 2, ... $2^N$–1.
2) Derive a secondary sequence for the initial sequence via cyclic decimation sample as $y_k = x_{qn}$, where $q=2^{N/2}+1$.
3) Kasami sequences are then formed by taking all $2^{N/2}$ unique time shifts of $y_k$ and performing an exclusive or (xor) operation with the initial sequence.

Figure 11:
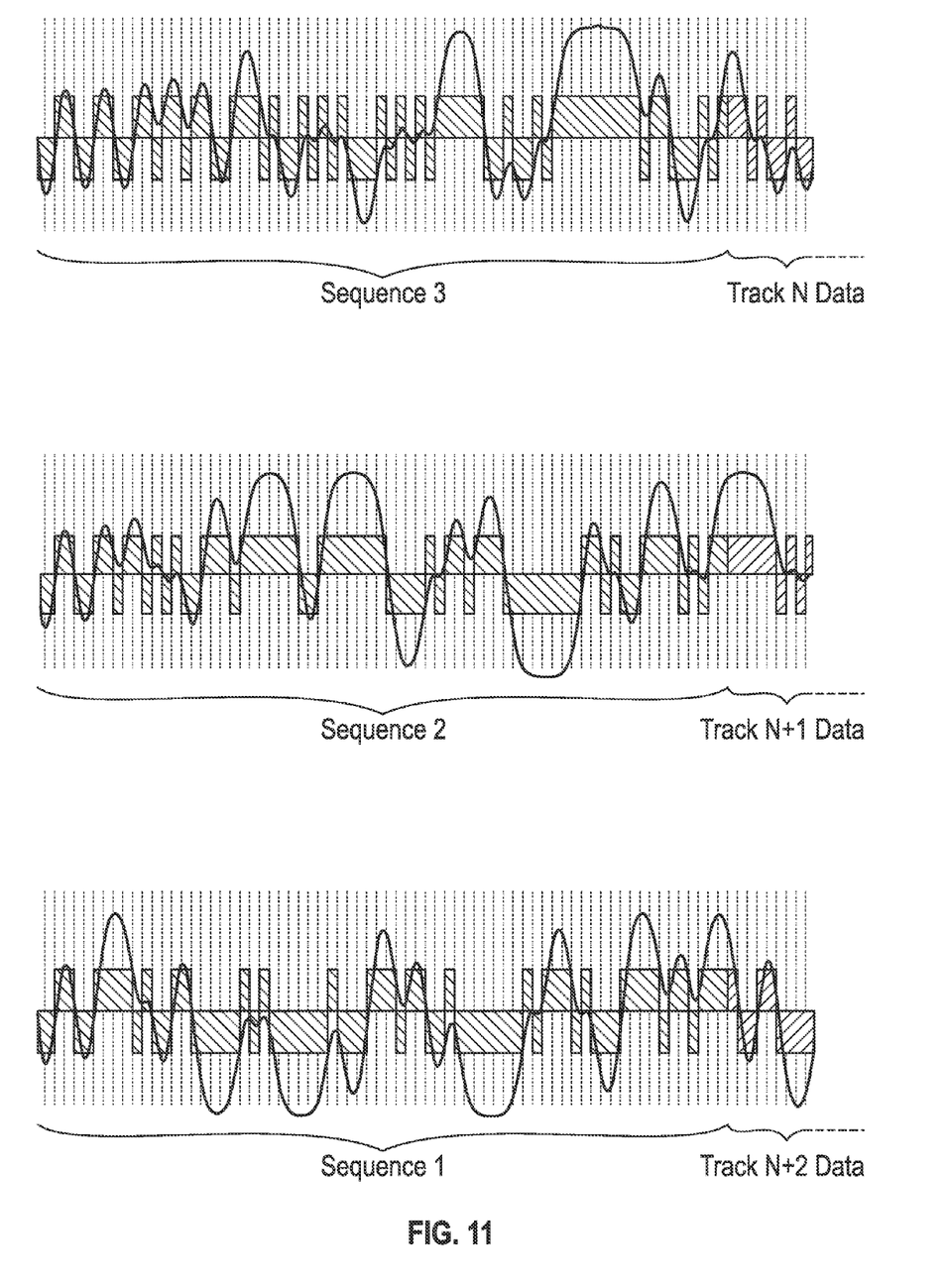
FIG. 11 shows specific bit patterns for three unique integrated preambles as Kasami sequences according to the second embodiment of the invention.

This procedure was used with N=6, to generate 8 Kasami sequences each with length 63, using the well-known MATLAB® software. An 8-bit pad (0 0 1 1 0 0 1 1) was added to each 63-bit sequence to accommodate any read gate jitter and thus ensure that all 63 bits of the Kasami sequence will be read. Three of eight sequences were then chosen for illustrative purposes and are shown in FIG. 11. In practice, the 3 best of 8 could be chosen according to which sequences have the lowest cross-correlation or by simply using those that give the best empirically determined performance.

Figure 12:
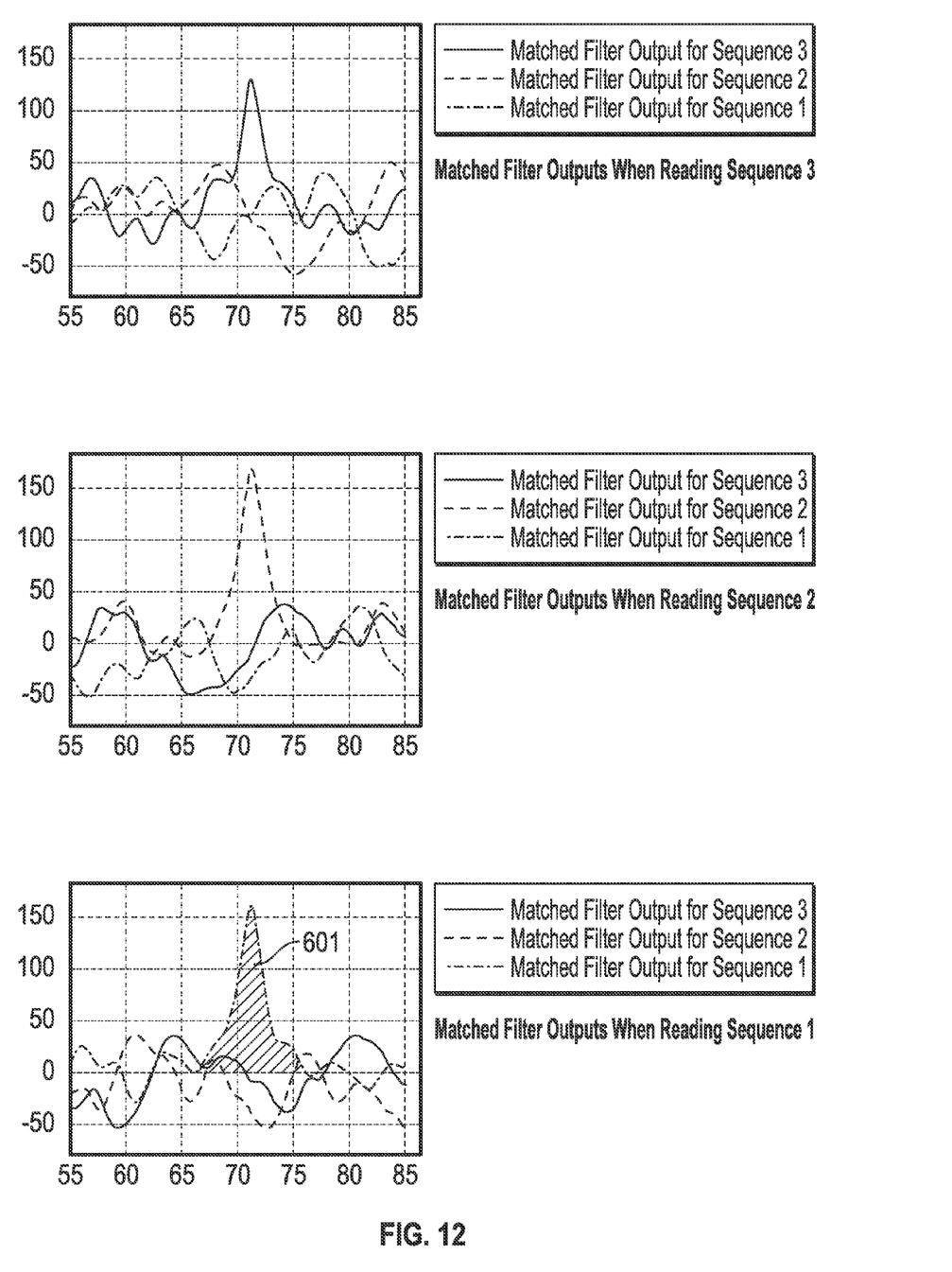
FIG. 12 is the output of three matched filters for the three unique sequences of FIG. 11 when each sequence is read.

FIG. 12 shows the output of three matched filters for these three unique Kasami sequences when each preamble sequence is read. The x-axis is the bit number and the y-axis is relative amplitude. The channel logic uses this output to calculate gain, bit synchronization and start-of-data.

Gain is determined from the area below the peak for each matched filter output. For example, referring to FIG. 12, if sequence 1 is being read, the shaded region 601 is the area under the peak for the output of matched filter 1. The areas under the peaks of matched filters 2 and 3 are also calculated. The channel logic can calculate the areas by integration. This area is proportional to the amplitude of the signal read by the head. If no single distinguishable peak is observed for a matched filter output the area may be set to zero. For example, in FIG. 12, for the reading of sequence 1, the areas from matched filters 2 and 3 may be set to zero. The gain can then be adjusted such that the sum of the area values computed for each matched filter output sum to some preset value (i.e., if the sum of the areas is smaller then the preset value the signal gain must be increased, and vice-versa).

Figure 13:
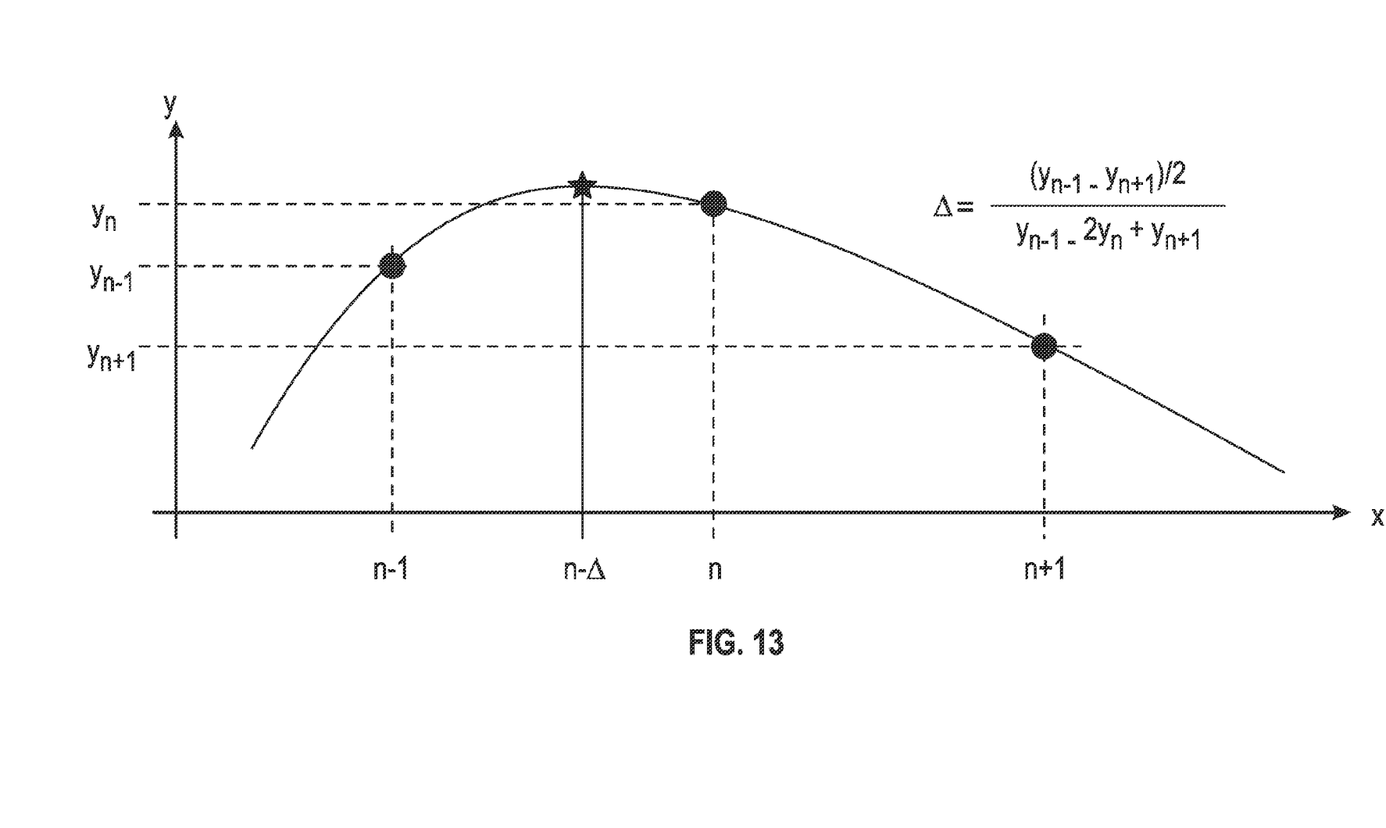
FIG. 13 is a graph for illustrating the method of estimating the peak location of the matched filter output when it occurs between bits.

Bit synchronization is obtained by determining the phase where the matched filter output obtains its peak value. For example, referring to FIG. 12, if sequence 3 is being read then the peak occurs at bit 71 for the output of matched filter 3. Since matched filter outputs are only available every sample time and the peak may occur between sample times, the actual peak location which determines the phase must be estimated from the sample. One such method for estimating this location is illustrated in FIG. 13, where $y_n$ is the peak sample value observed and the actual peak location is estimated to occur at position n-Δ between bits n−1 and n.

The location of the peak of the matched filter output precisely identifies the location of the preamble sequence. Since it is known that the data starts immediately after the preamble then the start-of-data is known and determined from the location of the peak of the matched filter output. For example, referring to FIG. 11, if sequence 3 is being read the peak occurs at bit 71. Thus the start-of-data is at bit 72. If the peak value for the output of the matched filter were less than a predetermined threshold value, this would indicate that start-of-data could not be found and the channel would send a failure flag to the HDC.

The operation of the HDD as described above may be implemented as a set of computer program instructions stored in memory and executable by a processor, such as the HDC, or a separate controller or microprocessor in the HDD. The processor may perform logical and arithmetic operations based on the program instructions stored in memory, and/or the functions described above may be performed by hardware in the read/write channel electronics.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:
   a substrate;
   a magnetic recording layer on the substrate, the recording layer having a plurality of radially-spaced data tracks;
   a plurality of data sectors in each track for the recording of data bits, each data sector having a nondata preamble bit sequence without a bit synchronization field and without a start-of-data indication field for its associated data sector, each preamble bit sequence being decodable to provide bit synchronization and start-of-data indication for its associated data sector; and
   wherein the preamble bit sequences are the same for all the data sectors in a track and the preamble bit sequences in each track are unique from the preamble bit sequences in radially adjacent tracks.

2. The disk according to claim 1 wherein there are at least two unique preamble bit sequences.

3. The disk according to claim 1 wherein there are three unique preamble bit sequences.

4. The disk according to claim 1 wherein each unique preamble bit sequence has small autocorrelation at nonzero lag.

5. The disk according to claim 1 wherein each unique preamble bit sequence has low cross-correlation with each other unique preamble bit sequence.

6. The disk according to claim 1 wherein each unique preamble bit sequence is a Kasami sequence.

7. The disk according to claim 1 wherein each unique preamble bit sequence is a Gold sequence.

8. The disk according to claim 1 wherein each unique preamble bit sequence is a zero-correlation zone (ZCZ) sequence.

9. The disk according to claim 1 wherein the data tracks are arranged into a plurality of annular zones.

10. A magnetic recording disk drive comprising:
    the disk according to claim 1;
    a controller for selecting a data track and data sector where data is to be written;
    read/write channel electronics coupled to the controller for identifying the unique preamble bit sequence associated with the selected data track; and
    a write head coupled to the channel electronics for writing said identified unique preamble bit sequence prior to writing data in the selected data sector.

11. A magnetic recording disk drive comprising:
    the disk according to claim 1;
    a controller for selecting a data track and data sector where data is to be read;
    read/write channel electronics coupled to the controller for identifying the unique preamble bit sequence associated with the selected data track;
    a read head coupled to the channel electronics for reading said identified unique preamble bit sequence and the data in the selected data sector; and wherein the channel electronics include a set of unique matched filters for receipt of the unique preamble bit sequence read by the read head, each matched filter in the set being associated with a unique preamble bit sequence, and logic for computing bit synchronization and start-of-data indication from the output of the set of matched filters.

12. A magnetic recording disk comprising:

a substrate;

a magnetic recording layer on the substrate, the recording layer having a plurality of radially-spaced data tracks;

a plurality of data sectors in each track for the recording of data bits, each data sector having a nondata preamble for bit synchronization and start-of-data indication, the preambles being the same for all the data sectors in a track, there being three unique preambles that periodically repeat radially in the tracks;

wherein each unique preamble is a bit sequence without a bit synchronization field and without a start-of-data indication field for its associated data sector, each unique preamble bit sequence being decodable to provide bit synchronization and start-of-data indication for its associated data sector; and wherein each unique preamble bit sequence has small auto-correlation at nonzero lag and low cross-correlation with each other unique preamble bit sequence.

13. The disk according to claim 12 wherein each unique preamble bit sequence is a Kasami sequence.

14. The disk according to claim 12 wherein each unique preamble bit sequence is a Gold sequence.

15. The disk according to claim 12 wherein each unique preamble bit sequence is a zero-correlation zone (ZCZ) sequence.

16. The disk according to claim 12 wherein the data tracks are arranged into a plurality of annular zones.

\* \* \* \* \*